UNITED STATES PATENT OFFICE.

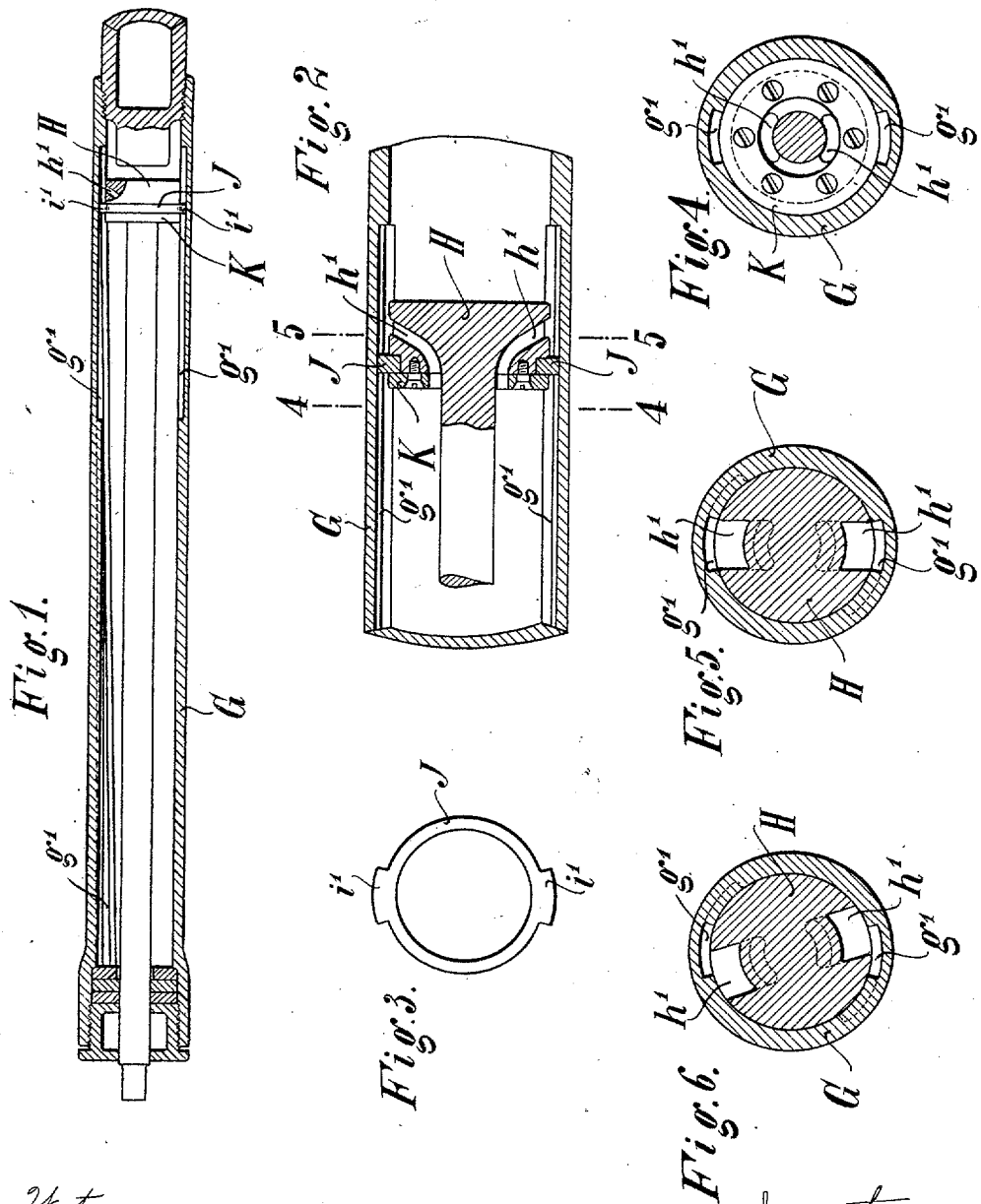

OTTO LAUBER AND NORBERT KOCH, OF ESSEN-ON-THE-RUHR, GERMANY, ASSIGNORS TO FRIED. KRUPP AKTIENGESELLSCHAFT, OF ESSEN-ON-THE-RUHR, GERMANY.

FLUID-BRAKE FOR RECOIL-GUNS.

No. 887,045.      Specification of Letters Patent.      Patented May 5, 1908.

Original application filed January 3, 1906, Serial No. 294,413. Divided and this application filed April 30, 1907. Serial No. 371,078.

*To all whom it may concern:*

Be it known that we, OTTO LAUBER, residing at Essen-on-the-Ruhr, (West,) Germany, and NORBERT KOCH, residing at Essen-on-the-Ruhr, Germany, both subjects of the Emperor of Germany, have invented a certain new and useful Improvement in Fluid-Brakes for Recoil-Guns, of which the following is a specification.

The present invention relates to fluid brakes for recoil guns provided with means for regulating the length of recoil, and the object of the invention is to provide a fluid brake which is of simple and compact construction and by means of which a particularly fine graduation of the length of recoil may be obtained.

In our co-pending application, filed Jan. 3, 1906, Ser. No. 294,413, of which this case is a division, we have claimed, broadly, the idea of providing a fluid brake with two relatively reciprocating parts, one of which is provided with a longitudinal groove, and the other of which controls the flow through the groove, the parts being provided with a relative rotary adjustment to vary the flow through the groove to change the length of the recoil.

This invention consists of certain parts and combinations of parts, as will be hereinafter described and pointed out in the appended claims.

In the accompanying drawing, one embodiment of the invention is shown by way of example.

Figure 1 is a longitudinal section of the brake, partly in side view; Fig. 2 is a longitudinal section on an enlarged scale of a part of the brake shown in Fig. 1; Fig. 3 is a detail; Fig. 4 is a sectional view on line 4—4 Fig. 2, seen from the left; Fig. 5 is a sectional view on line 5—5 Fig. 2, seen from the right; Fig. 6 is a view corresponding to that shown in Fig. 5 with changed position of one of the parts.

G is the brake cylinder and H is the piston. In the wall of the brake cylinder G are cut two curved grooves $g'$ which are located diametrically opposite one another and extend over the entire length of the hollow space of the brake cylinder. The grooves $g'$ extend spirally with such a pitch that the turning movement from end to end, or, in other words, the circumferential offset of one end from the other is equal to the width of the grooves. The width of the grooves is such that the circumferential dimension of these parts of the wall of the brake cylinder, that are between the grooves, are wider than the grooves. The piston H is provided with two apertures $h'$ which extend from the piston rod side of the brake cylinder to the cylindrical surface of the piston. The shape of the apertures $h'$ and their arrangement relatively to the grooves $g'$ is shown in the drawing. The passage of the fluid from one side of the piston to the other side is confined to the apertures $h'$ through the medium of a rotatable ring J which is arranged in an annular groove in the piston and which is provided with two lugs $i'$ (see particularly Fig. 3) that engage with the grooves $g'$ without play therein. A ring K (see Figs. 1, 2 and 4) which is firmly secured to the piston, prevents axial movement of the ring J.

When the parts assume the position shown in Figs. 1, 2 and 5 and the recoil takes place, the fluid passes from the space around the piston rod through the apertures $h'$ and the grooves $g'$, and flows to the space beyond the piston. In consequence of the spiral course of the grooves $g'$ the apertures $h'$, during the recoil, will be gradually cut off by these parts of the wall of the brake cylinder that are between the grooves $g'$, that is to say, the area of the passage at the point where the fluid passes from the apertures $h'$ into the grooves $g'$ will be gradually diminished and the fluid is consequently throttled progressively. When finally the apertures $h'$ are entirely covered by these parts of the wall of the brake cylinder that are between the grooves $g'$, the passage for the fluid is cut off and the recoiling parts come to a standstill, which, however by reason of the dimensions of the grooves $g'$ and the apertures $h'$, does not take place until the piston has completed its full (normal) stroke.

If it is desired to obtain a recoil the length of which is about half the normal recoil, the piston rod is turned by hand or automatically until the apertures $h'$ of the piston H are approximately half way cut off by the wall of the brake cylinder, when the parts are in the position of rest (see Fig. 6). When the recoil commences the available area for the passage of the fluid is in this instance correspondingly smaller and during the recoil it is gradually contracted and finally entirely closed, thereupon the moving parts come to a standstill.

It is evident, that the normal length of recoil and that corresponding to the position of the piston relatively to the grooves $g'$, which is shown in Fig. 6, are not the only lengths of recoil obtainable; on the contrary, by suitable adjustment of the piston rod any other lengths of recoils between the normal and the shortest permissable may be obtained. The device, therefore, makes it possible to obtain a very fine graduation of the length of recoil.

The brake according to the present invention must of course be attached to the gun in such a manner, that during the recoil the piston cannot turn relatively to the brake cylinder.

Having thus described the invention, what we claim as new therein and desire to secure by Letters Patent is:

1. A fluid recoil brake comprising a cylinder carrying a spiral groove and a piston controlling the flow through said groove; said parts being capable of relative rotary adjustment to vary the length of the recoil.

2. A fluid recoil brake comprising a cylinder carrying a spiral groove, and a piston having an aperture forming with said groove a passage for the flow of fluid from one side of the piston to the other; the cylinder and the piston being capable of relative rotary adjustment to vary the flow through said passage.

3. A fluid recoil brake comprising a cylinder carrying a longitudinal inclined groove, a piston having an aperture forming with said groove a passage for the flow of fluid from one side of the piston to the other, and means carried by the piston for confining the flow to said passage; the cylinder and the piston being capable of relative rotary adjustment to vary the flow through said passage.

4. A fluid recoil brake comprising a cylinder carrying a longitudinal inclined groove, a piston having an aperture forming with said groove a passage for the flow of fluid from one side of the piston to the other, and a rotatable part carried by the piston and having a lug snugly fitting the groove in the cylinder to confine the flow to said passage; the piston and the cylinder being capable of relative rotary adjustment to vary the flow through said passage.

The foregoing specification signed at Dusseldorf, Germany, this eleventh day of April, 1907.

OTTO LAUBER.
NORBERT KOCH.

In presence of—
ALFRED POHLMEYER,
M. ENGELS.